United States Patent [19]

Huang et al.

[11] Patent Number: 5,595,659

[45] Date of Patent: Jan. 21, 1997

[54] FILTER MATERIAL FOR REMOVING CHLORINE FROM COLD WATER IN PREPARING A HUMAN-CONSUMABLE BEVERAGE

[75] Inventors: Ming-Teh Huang, Durham; David R. Lambert, Somersworth; Robert F. Gatta, Durham; Kevin G. Lynch, Hampton, all of N.H.

[73] Assignee: Lydall, Inc., Manchester, Conn.

[21] Appl. No.: 390,672

[22] Filed: Feb. 17, 1995

[51] Int. Cl.⁶ .................................................. B01D 39/02
[52] U.S. Cl. .................. 210/502.1; 210/504; 210/505
[58] Field of Search ................................. 210/503, 504, 210/505, 506, 507, 508, 502.1

[56] References Cited

U.S. PATENT DOCUMENTS 3,573,158  3/1971  Pall et al. ............................... 162/131

*Primary Examiner*—Frank Spear
*Attorney, Agent, or Firm*—Griffin, Butler, Whisenhunt & Kurtossy

[57] ABSTRACT

A filter material for removing chlorine from cold water used in preparing a human-consumable beverage having at least one layer of a mat of laid fibers of cellulosic fibers and synthetic textile fibers and mixtures thereof. A synthetic hydrophilic, food-grade latex binder deposited onto the fibers within the mat in an amount sufficient to so bind the fibers together within the mat that during a filtration of cold water through the mat no substantial amount of fibers are displaced therefrom and in an amount insufficient to substantially reduce a gravity flow rate of cold water through the mat to less than about 0.3 liter per minute per 100 square centimeters of the mat. A water-insoluble chlorine adsorbent or absorbent solid powder disposed on the binder such that no more than 65% of the total outside surface area of the powder is substantially contacted by the binder.

37 Claims, 3 Drawing Sheets

FILTER MATERIAL FOR REMOVING CHLORINE FROM COLD WATER IN PREPARING A HUMAN-CONSUMABLE BEVERAGE

The present invention relates to a filter material which is capable of removing chlorine from water such that the water is more acceptable for use in preparing human-consumable beverages, especially in that the taste of the water and, hence, the taste of the beverage is improved.

BACKGROUND OF THE INVENTION

It has long been known that typical city water supplies have a variety of contaminants which contribute to an unpleasant taste of a beverage made from that city water. Among these contaminants are lead, hydrocarbons, calcium, iron, sulfides, and especially chlorine used in purifying the city water. While all of these contaminants contribute to the unpleasant taste of beverages prepared from such city water, chlorine is probably the most usual and troublesome contaminant, since it is normally present in all city water, due to the purification process, and since it can be detected in beverages in very small amounts. While the unpleasant taste of the beverage prepared from such city water is detectable in almost every beverage so prepared, including reconstituted orange juice, soft drinks, iced drinking water, and the like, it is particularly troublesome in connection with beverages which are heated during preparation, e.g. tea and coffee.

The art has long sought effective means of removing such contaminants, especially chlorine, from such city water, and a number of approaches in the art have been taken. For example, one approach is that of a porous plastic film filter with pores sufficiently small to filter contaminants, such as chlorine, from the water, but such filters have a very low gravity flow rate, and to use such filters requires considerable time for filtration of the water in beverage preparation.

Another approach is that of providing a matrix of fibers and activated charcoal where the activated charcoal will remove contaminants, especially chlorine, but to make such filters satisfactory, the fibers must be made of materials which will not support bacterial growth, since, otherwise, continued use of such filters would cause a health problem. To substantially avoid bacterial growth, such filters, with activated carbon therein, are made with hydrophobic synthetic polymer fibers, which are generally non-porous, and hence will not support bacterial growth resulting from absorbed nutrients from the water. However, filters made from such hydrophobic fibers have a very low gravity flow rate, and to be useful in a practical sense, filters of that nature must be operated under substantial pressure, e.g. city water pressure. Thus, filters of that nature have been limited, generally, to "in-line" filters, i.e. filters disposed in the city water pressure lines of a house, manufacturing facility, or the like or at the taps thereof. These filters, therefore, operate generally with city water pressure, e.g. about 40 psi or more. While this arrangement is satisfactory for in-line filters, such an arrangement is not satisfactory for gravity flow filters. In addition, filters of this nature must be contained in a canister and protected by media around the filter for preventing particles of activated carbon from passing through the filter, during use, and into the consumable water. This further decreases the pressure drop across those filters and, consequently, requires the higher city water pressures for effective use thereof.

Efforts have been made in the art to improve flow rates with less pressure for effective use thereof, and U.S. Pat. Nos. 4,395,332; 4,505,823; and 4,569,756 are representative thereof. These patents describe filters for removing contaminants from water, where the filters contain cellulose fibers and an additional strengthening fiber, such as a polyester fiber, as well as a contaminant adsorbent, which, among others, can be activated carbon or charcoal. In addition, these filters contain micro-bits of polymers, which polymers can be, for example, polystyrene polymers, polyolefin polymers and the like. These micro-bits retain porosity in the filters and, therefore, provide greater flow rate with less pressure drop through the filters. Thus, the filters are said to be useful for filtering tap water for drinking and cooking use in a gravity flow filter device and, particularly, a conical filter for filtering tap water from a tap with such conical filter device is disclosed. However, the filters of these patents, while said to be useful in filtering tap water by gravity flow filtration for drinking and cooking purposes, are composed, in a specific example, of cellulose fibers, polyester fibers, activated charcoal, a binder for binding the fibers together to improve the strength thereof, and the micro-bits, which combination still has a very low gravity flow filtration rate. While that low filtration rate is suitable for some purposes, it is not suitable for a variety of other purposes.

In this latter regard, as noted above, beverages which are heated in preparing the beverage are particularly susceptible to the taste of tap water contaminants, especially chlorine, and very typical of such beverages are coffee and tea. Both coffee and tea may be brewed in a conventional coffee making machine, where cold water is heated by an electrical heating element and, after being heated, is fed through a basket containing the coffee or tea by which the brewed coffee or brewed tea is made and discharged from that basket by gravity into a pot. As the art has well appreciated, in order to make a filter suitable for such machines, the filter must have a flow rate consistent with the brewing rate of the machine. Otherwise, the time for brewing, for example, a pot of coffee, would be greatly increased, and the heating element of the machine could be starved for water and burn out or the hot water supplied to the basket containing the tea or coffee could be seriously reduced, and ineffective brewing and long brewing time would result. Thus, gravity filters with such reduced flow rates are not satisfactory for those purposes. Moreover, those patents do not describe any practical means of retaining the activated charcoal in the filter, and any substantial amount of activated charcoal that passes through the filter into the brewed coffee or tea, of course, would be quite unacceptable.

A somewhat similar but yet slightly different approach in the art is described in U.S. Pat. No. 4,160,059, where a filter is proposed that is made of wood pulp and/or synthetic fiber, a heat-fusible fiber, and an adsorptive material, such as activated charcoal. The heat-fusible fiber is heated to fuse the charcoal to the fibers of the filter, which, therefore, presumably locks the activated charcoal particles in place and prevents that activated charcoal from passing through the filter and into a beverage. This fusing of the charcoal particles to the fibers is considered a better approach than that of the prior art where latex binders have been used for binding the charcoal to fibers.

In this latter regard, U.S. Pat. No. 3,158,532 teaches a filter material made of various fibers, including polyester fibers and paper fibers, and a bonding agent or binder for binding particulate material to deposited layers of fibers, and the particulate material, in addition to a number of others, can be activated carbon. Among the binders suggested are polyacrylic resins.

It has also long been recognized that hydrophilic fibers forming a filter material will substantially increase the flow rate of water and similar water-containing fluids through the filter, and commercial milk filters are commonly made of cellulose fibers for this purpose, e.g. cotton, rayon and mixtures thereof. Such filters have also been made with a combination of rayon fibers and synthetic fibers, such as polyester fibers, polyolefin fibers, polyacrylate fibers, and polyamide fibers, in order to provide better physical properties to those filters, and U.S. Pat. No. 3,307,706, is representative thereof.

Various forms of filters using activated carbon have also been described in the art, such as pleated forms and tape-like porous material, and U.S. Pat. Nos. 4,130,487 and 4,645,597 are representative thereof.

From the foregoing, it can be seen that the art has approached filters of the present nature from various directions, but the art has not been successful in providing a filter which will give high flow rates of gravity-filtered water, which will remove substantial amounts of contaminants, especially chlorine, which will ensure that a chlorine absorbent or adsorbent will not be displaced from the filter and into the water for producing the beverage, which will not support bacterial growth with considerable reusage of the filter, and which can be so inexpensively produced as to be practical, especially, for home use, and more especially in conventional coffee making machines. It would, therefore, be of considerable advantage to the art to provide a filter which meets all of the foregoing requirements, and which, in addition, can remove very substantial amounts of contaminants, especially chlorine.

BRIEF DESCRIPTION OF THE INVENTION

The present invention, therefore, provides a filter material for removing chlorine (as well as other contaminants) from cold water used in preparing a human-consumable beverage and which can be reused a number of times with safety and which will provide a high flow rate with gravity filtration. The invention is based on several primary and several subsidiary discoveries.

First of all, it was discovered that the dilemma of the art of hydrophilic fibers versus hydrophobic fibers briefly mentioned above can be solved. Thus, while hydrophilic fibers, such as cellulose fibers, provide much higher gravity flow rates, those fibers, being pervious to water, can support bacterial growth on absorbed nutrients from the water and are therefore not acceptable for serial, time spaced-apart uses of the filter. On the other hand, synthetic hydrophobic fibers, such as polyester fibers, are not pervious to water and, hence, will not support bacterial growth, due to the lack of absorbed nutrients from the water for bacterial growth, but those fibers, being hydrophobic, seriously decrease the gravity flow rate of a filter made therefrom. This dilemma of the art has been solved by the present invention in that either or both of cellulosic fibers or synthetic fibers may be used to provide an effective filter with high gravity flow rates when those fibers have deposited thereon a food-grade hydrophilic latex binder. With such binder substantially coating the fibers of the filter, the filter will have high gravity flow rates because of the hydrophilic nature of the binder, irrespective of whether the fibers are hydrophobic, e.g. polyester fibers, or hydrophilic, e.g. cellulosic fibers. In addition, since the binder is a food-grade binder, it will not, by definition, support bacterial growth, even when used for a number of serially, time spaced-apart filtrations.

As a subsidiary discovery in this regard, it was found that acrylic latex binders are particularly useful in this regard, since those binders provide more of a sticky property for adhering activated charcoal to the binder, as described below.

As a further primary discovery, it was found that the amount of the binder deposited onto the fibers within a mat of fibers must be sufficient to so bind the fibers together within the mat that, during filtration of cold water through the mat, no substantial amount of fibers are displaced from the mat but, at the same time, in an amount insufficient to substantially reduce a gravity flow rate of cold water through the mat to less that 0.3 liters per minute per 100 square centimeters of the mat.

Thus, by providing, substantially a covering of the hydrophilic food-grade latex binder on the fibers, bacterial growth will be inhibited, even with serial, time spaced-apart uses of the filter, while, at the same time, the gravity flow rate through the filter will be maintained at a rate sufficient for use in conventional devices, such as coffee making machines.

A third primary discovery again solves a dilemma in the art. While the art, as noted above, had used binders in connection with such filters, activated charcoal, in the form of a powder, was substantially "blinded" by the binders, i.e. the binders substantially covered the particles of activated charcoal and "blinded" those particles from removing contaminants, especially chlorine. On the other hand, if such binders were not used, or used in such small amounts so as to avoid that blinding of the activated charcoal, the activated charcoal was liable to pass through the filter and into the water used for making beverages, which is quite undesirable. This dilemma in the art was solved by an arrangement such that the powder used for adsorbing or absorbing contaminants, e.g. chlorine, such as activated charcoal, is disposed on the binder, as opposed to largely within the binder, and disposed on the binder such that no more than 65% of the total outside surface area of the powder is substantially contacted by the binder, and preferably a much smaller percentage thereof. This still provides considerable outside surface area of the powder for removing contaminants. At the same time, that powder is so attached to the binder that it will not be displaced during use of the filter and into the water intended for beverage making.

As a subsidiary discovery, it was found that the stickiness of the binder may be such as to provide good adhesion of fibers to fibers such that the mat forming the filter material has high strengths and can be manipulated and used a number of times without being substantially disrupted or the fibers displaced from the filter into the water or so displaced that channeling or the like of the water through the filter occurs, which is, of course, not desired.

As another primary discovery, it was found that the powder could be deposited onto the binder, in the above-described manner, by a step in a process for making the filter material. In this regard, an emulsion-breaking agent is added during processing of the fibers and binder such that the latex binder, in emulsion form, precipitates onto the fibers, and, thereafter, the powder is added to that combination such that a large portion of the surface area of the powder remains out of contact with the binder, while at the same time the powder is firmly attached to the binder and will not be displaced.

Thus, briefly stated, the present invention provides a filter material for removing chlorine from cold water used in preparing a human-consumable beverage. The filter material comprises at least one layer of a mat of laid fibers selected from the group consisting of cellulosic fibers and synthetic textile fibers and mixtures thereof. A synthetic hydrophilic food-grade latex binder is deposited onto the fibers within the mat in an amount sufficient to so bind the fibers together within the mat that, during a filtration of cold water through the mat, no substantial amount of fibers are displaced therefrom and in an amount insufficient to substantially reduce a gravity flow rate of cold water through the mat to less than 0.3 liters per minute per 100 square centimeters of the mat. A water-insoluble chlorine adsorbent or absorbent solid powder is disposed on the binder such that no more than 65% of the total surface area of the powder is substantially contacted by the binder.

In the method of the invention, the fibers are mixed in water to form a dispersion of the fibers in the water. The latex binder in the form of an emulsion is added and mixed with the dispersion to form a dispersed mixture of the fibers and emulsion. An emulsion-breaking agent is added and mixed therewith to precipitate the binder onto the fiber combination, where the precipitated binder is deposited onto the fibers within the mat. The powder is then added to that combination, with mixing, to dispose the powder on the binder and form a matting material. Thereafter, a mat is formed of that matting material, which constitutes the filter material of the invention.

DETAILED DESCRIPTION OF PREFERRED EMBODIMENTS

While, as noted above, the invention is adaptable to a variety of applications for gravity filtering of water for beverage use, and, as further noted above, the filter material of the invention will remove a number of contaminants from tap water, and the specification and claims should be so construed, for conciseness in this specification, the invention will be illustrated in terms of filters, primarily, useful in conventional coffee making machines and will reference, by example, chlorine removal from the filtered tap water.

Figure 1:
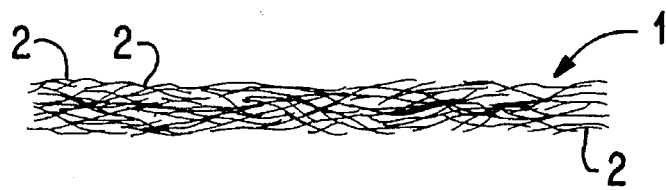
FIG. 1 is a diagrammatic illustration of a layer of the filter material of the invention.

As can be seen from FIG. 1, the filter material comprises at least one layer of a mat, generally 1, of laid fibers 2. In this regard, the term "laid" is used in its common meaning, i.e. that the fibers have been laid (air laid or wet laid) onto a forming device, e.g. a screen, on which the fibers entangle into mat form. While in such conventional laying process, the fibers extend in all of the X, Y and Z directions of the mat, the fibers more generally are parallel to the forming surface, e.g. parallel to a screen on which the fibers are laid. Laid fibrous mats of this nature are conventionally made on conventional paper-making machines and are consolidated during the laying and forming steps, generally with further consolidation through pressure rolls, all of which is well known in the art and need not be recited herein in detail for purposes of conciseness. However, it is noted that within the meaning of the term "laid" is the condition that the mat is not a woven mat or a needled mat or a felted mat, but only a "laid" mat. It is important for purposes of the present invention that the mat be of laid fibers, since such laid fibers provide orientations of the fibers that are most useful in applying the binder, as described below, and in providing uniform filtration for removal of chlorine.

The fibers are selected from the group consisting of cellulosic fibers and synthetic textile fibers and mixtures thereof. Again, these terms are used in their ordinary sense, in that a textile fiber is, generally speaking, from about 1 to 20 deniers, capable of being formed into a textile, and may be of either continuous or staple form. Synthetic textile fibers are made from a variety of synthetic hydrophobic polymers. Thus, the textile fibers may be polyester fibers, nylon fibers, vinyl fibers, acrylic fibers, and the like, and the particular synthetic textile fiber is not critical to the invention. Inherent in this definition is that the fibers are non-porous and hydrophobic.

While cellulosic fibers may be in the form of textile fibers, that term also includes fibers which are not useful in forming textiles, but are more useful in forming paper and the like. Thus, the term "cellulosic fibers" includes not only fibers in a form suitable for textile formation, but suitable for paper making. The fibers may be cellulose fibers, modified cellulose fibers, and the like. The particular cellulosic fiber is not critical so long as the cellulose of the fibers has not been so modified that the fiber is no longer hydrophilic. Thus, within the definition of the term "cellulosic fibers" is included the requirement that the fibers are porous and hydrophilic.

Figure 2:
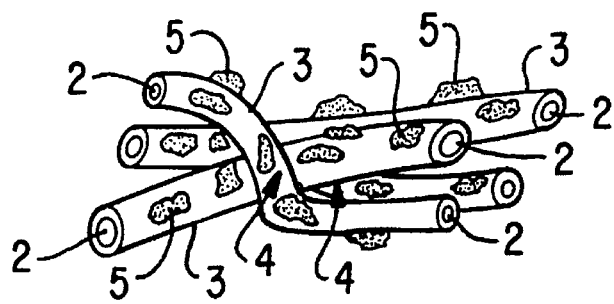
FIG. 2 is a highly idealized diagrammatic illustration of the binder on fibers of the filter material of FIG. 1 and adhering activated carbon powder thereto.

As can be seen from FIG. 2, deposited on the fibers 2 is a synthetic hydrophilic food-grade latex binder 3. That binder, preferably, substantially covers the entire surface area of the fibers in layer 1, as shown in FIG. 2, and is in an amount sufficient to so bind the fibers together within the mat, e.g. at crossover points 4, that during a filtration of cold water through the layer(s) 1 of the mat no substantial amount of fibers 2 are detached therefrom. In addition, the amount of binder must be insufficient to reduce a gravity flow rate of cold water through the mat to less than about 0.3 liters per minute per 100 square centimeters of the mat, since, otherwise, the gravity flow rate of cold water through the mat would not be sufficient to supply an ordinary and conventional coffee maker with sufficient water for making coffee at the usual rate of that coffee maker.

As also shown in FIG. 2, a water insoluble chlorine adsorbent or absorbent solid powder 5 (in particle form) is disposed on the binder 3 such that no more than 65% of the total outside surface area of the powder is substantially contacted by the binder, as shown in FIG. 2. Also as shown in FIG. 2, portions of the particles do contact and are submerged or embedded into the sticky binder 3, but portions of the particles 5 protrude out of the binder 3 and are free from and do not substantially contact the binder. Those protruding portions are, therefore, available for contacting water passing through the filter and adsorbing and/or absorbing contaminants, especially chlorine, therefrom. In addition, since activated carbon has a multitude of inner-connected passageways inside the particles 5, by providing this unimpeded outer surface of the powder, sufficient total surface area (outside and inside surface area) is provided to remove contaminants from the water and to move those contaminants deep into the passageways of the particles of powder, even thought deeper passageways of the particles are submerged within the binder.

Figure 3:
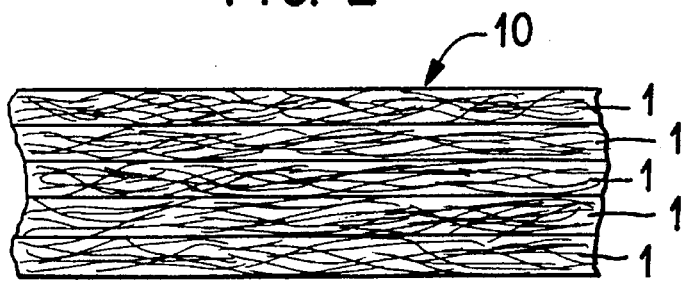
FIG. 3 is a diagrammatic illustration of a plurality of layers of FIG. 1 combined into a single filter media.

As shown in FIG. 3, a plurality of layers 1 may make a filter media, generally 10, and five such layers 1 are shown in FIG. 3. Generally speaking, however, if multiple layers are used, as opposed to only one layer, there will be at least 2 and up to 20 layers in a filter media 10, but more preferably there are about 3 to 7 layers of the mat in a filter media.

Figure 4:
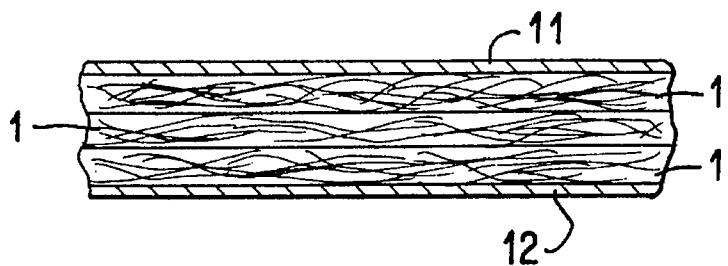
FIG. 4 also shows a plurality of layers of filter material forming a filter media, but with an enclosing top cover and bottom cover for cosmetic purposes.

FIG. 4 shows an optional embodiment where three layers 1 of the mat are contained within a top cover 11 and a bottom cover 12. The coverings 11, 12 are not required, but since, as explained below, the layers 1 will contain substantial amounts of activated carbon, which is black in color, and which color will show through the layers 1, the covers 11 and 12 may be used simply for cosmetic or appearance purposes to hide the black color of the layers. This is because some users would object to a black filter for filtering water for beverage purposes.

The fibers of the mat of layers 1 may be all cellulosic fibers or all synthetic textile fibers or a mixture of cellulosic fibers and synthetic textile fibers. Alternately, one layer 1 of the mat may be all cellulosic fibers and another layer 1 of the mat be all synthetic textile fibers, with yet a further layer of the mat being a mixture of synthetic textile fibers and cellulosic fibers. In other words, alternating layers, as shown in FIG. 3, may have various compositions of the synthetic textile fibers, the cellulosic fibers or mixtures thereof. When there is a mixture of the cellulosic fibers and the synthetic textile fibers, the ratio thereof can be as desired, but, generally speaking, it is preferable that the mixture have a preponderance of cellulosic fibers, e.g. where the weight percent of the synthetic fibers is from about 1 to 20%, especially about 5 to 15%, since these ranges give better results, especially where the synthetic fibers are the preferred fibers, i.e. an acrylic fiber or a polyester fiber.

While, as noted above, it is preferable that the binder substantially cover all of the surface area of the fibers, in certain applications it may be desirable to have less than such coverage, especially where the filter material is intended for complicated configurations and bendings. In such case, for example, only 60% or 70% or, perhaps, 80% of the surface area of the fibers is covered by a binder, and when a synthetic fiber is in the composition, that uncovered portion of the synthetic fiber will present a hydrophobic surface. This will decrease the flow rate, and, in that case, it is preferred that a solid food-grade surfactant is disposed within the mat, and more preferably disposed within the binder itself. This will provide less surface tension to the water being filtered and still maintain the appropriate flow rate. When such a solid food-grade surfactant is used, preferably, about 0.1 to 2% thereof is used, based on the weight of the mat. A suitable surfactant is Dow-Corning Q2-5247, which is a silicone food-grade surfactant.

A wide variety of synthetic fibers may be used, including acrylic fibers, polyester fibers, nylon fibers, olefin fibers, and vinyl fibers, and the particular synthetic fiber is not critical, especially when essentially covered with a binder or when a surfactant is used. However, as noted above, acrylic fibers and polyester fibers are preferred.

Likewise, the cellulosic fiber is not critical and may be cellulose fibers, methylcellulose fibers, rayon and cotton fibers, although cellulose fibers are preferred.

While the latex binder, again, can be chosen from a wide variety of binders, including an acrylic latex, a vinyl latex, an acrylonitrile latex, and an acrylate latex, the preferred latex is an acrylic latex, and especially a modified polyacrylic polymer latex. Such latex is commercially available under the trademark HYCAR sold by B. F. Goodrich. HYCAR 26083 is a particularly good latex in this regard and is a self-crosslinking carboxylated latex with excellent abrasion resistance. It forms a film with substantial clarity. However, other acceptable latexes are vinyl latexes, nitrile latexes, styrene-butylene latexes, also sold by B. F. Goodrich under the trademarks GEON, HYCAR and GOOD-RITE. Nevertheless, for the reasons noted above, the acrylic latex is preferred.

While the amount of binder should be as described above, for most of the latexes immediately described above, the amount of the binder in the mat is from about 5% to 40% based on the weight of the mat, and more preferably about 10% to 30%.

The water-insoluble chlorine adsorbent or absorbent solid powder, as noted above, also absorbs other contaminants, but for sake of conciseness in this specification, the contaminants are illustrated as chlorine. That powder, therefore, may be a variety of powders, such as diatomaceous earth, fuller's earth and the like, but for substantial and desired reductions in chlorine content of the filtered water, the powder is activated carbon. The activated carbon may be activated carbon per se, or impregnated with silver or nickel so as to increase the bacterial static property of the activated carbon. In this regard, since the binder is a food-grade binder, it is, by definition, a binder which will not support bacterial growth and is referred to as bacterially static, i.e. the amount of bacterial growth that will occur on the binder is not significant from a human health point of view. Thus, in order to complement the bacterial static property of the binder, the powder should also be bacterially static. While activated carbon is essentially bacterially static, at least for reasonable times of use, for certain waters, e.g. those high in bacterial nutrients or bacterial content, it may be advisable to use nickel- or silver-impregnated activated carbon, since these increase the bacterial resistance of the activated carbon and ensures that bacterial static property.

The amount of the powder contained in a mat will depend upon the amount of contaminants to be removed from the filtered water, the number of times a mat is envisioned for repeated and time spaced-apart use, and the ability of the binder to hold amounts of the powder firmly and substantially non-detachably thereto. In this latter regard, certain binders can so retain different amounts of the powder. Therefore, with some of the binders, the amount of the powder should not be more than about 20%, based on the weight of the mat, while with other of the binders, up to about 70% of the powder may be used in the mat, again based on the weight of the mat. With the preferred acrylic binder, as briefly noted above, that binder presents a very sticky surface and is capable of retaining large amounts of powder, e.g. activated charcoal, up to 70%, based on the weight of the mat. However, more usually, that percentage will be between about 40% and 60%, and more ideally about 50%. However, for high removal of chlorine, the amount of the powder should be more than 40%.

The amount of chlorine that can be removed from the powder, of course, will depend upon the average particle size of the powder. For purposes of the present specification, a powder is defined as a solid adsorbent or absorbent having an average particle size of less than 2,000 microns, but more preferably the average particle size will be less than 1,000 microns, and more preferably less than 100 microns, so as to maximize chlorine removal, in view of the larger outer and internal surface areas provided per weight amount of the powder with decreasing particle size.

By use of such sticky binder to retain both the fibers and the powder so that they do not pass from the filter material, and by use of the present bacterially static components, a mat of filter material may be used for up to 50 time spaced-apart filtrations, i.e. time spaced apart sufficiently that substantial bacterial growth could take place between uses, as in daily use of a coffee maker. This must be, also, without significant displacement of either fibers or activated carbon from the filter and into the water for beverage purposes. That number of filtrations, of course, will depend upon the number of layers, the amount of activated carbon, and the particular binder, but even with a small number of layers and with other than the most preferred binder, i.e. the acrylic binder, at least up to 50 such filtrations may so take place. Even with only one layer, and especially with the preferred binder, the mat will remain substantially bacterially static for up to 10 time spaced-apart filtrations, and this is particularly true where the binder substantially covers the surfaces of the fibers in the mat, and more especially where the binder is substantially continuous over the fibers of mat.

Figure 5:
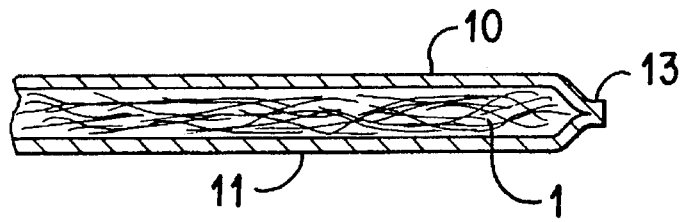
FIG. 5 shows, in diagrammatic form, a closed end of a suitable filter media.
Figure 6:
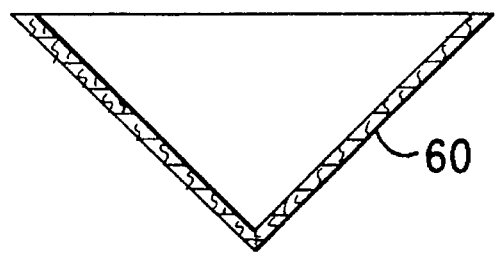
FIGS. 6, 7 and 8 show embodiments of configurations of the filter material.
Figure 7:
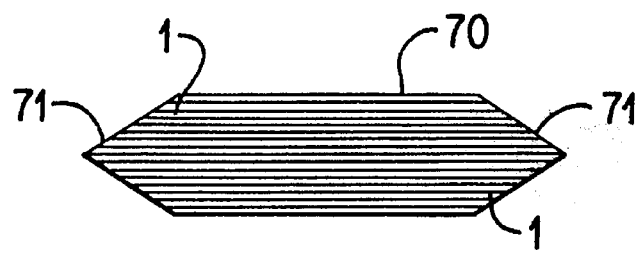

Turning again to the drawings, FIG. 5 shows a single layer 1 with covers 11, 12 and sealed edges 13, e.g. by heat welding, gluing, etc. FIG. 6 shows the filter material in the form of a cone 60, which could be used, for example, to filter water into a pitcher for removing chlorine in preparation of frozen orange juice, or that configuration could be used for preparing coffee in a coffee maker which consists essentially of a filter holder and a pot, where the coffee is placed in the filter holder and hot water is poured therethrough. Alternatively, a filter media may be made in the form of a disk 70, as shown in FIG. 7, with a number of layers 1 of filter material forming that disk 70. In this case, the edges 71 of the disk 70 will normally be gathered together and sealed, as in FIG. 5, so as to make the composite of the layers a somewhat unitary structure. This sealing, again, can be by gluing, heat sealing, ultrasonic welding, and the like, and the particular means of sealing is not critical to the invention.

Figure 8:
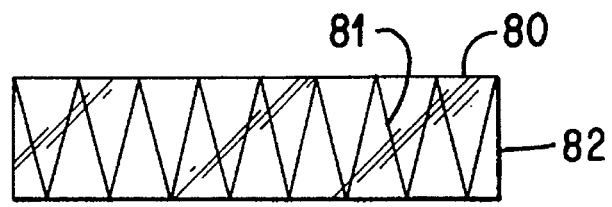

As a further embodiment, the filter material may be a pleated filter 80, as shown in FIG. 8, having a plurality of pleats 81 held in a holder 82 to retain those pleats.

Figure 9:
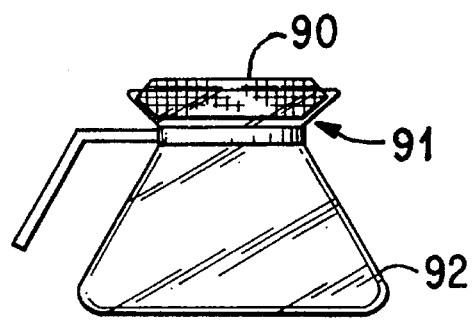
FIG. 9 shows the filter material in place on a pot for filtering tap water for producing a beverage.

As yet a further alternative, as shown in FIG. 9, the filter material 90 may be in something of a conical disk shape 91 for fitting over the top of the conventional pot 92 for filtering water therethrough.

Figure 10:
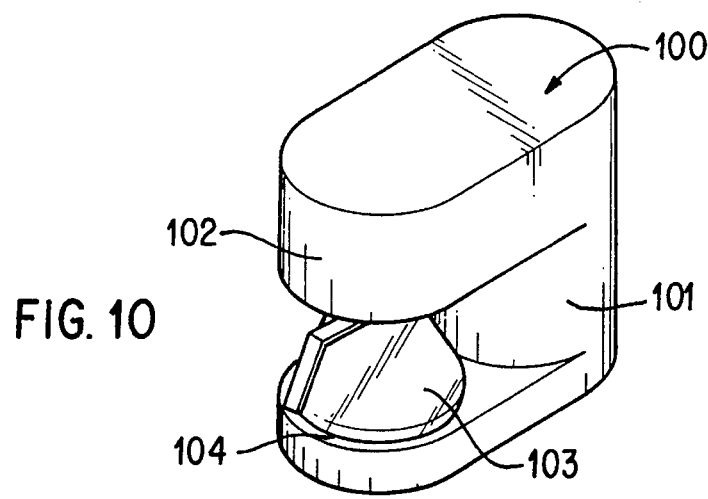
FIG. 10 shows a conventional coffee making machine.

FIG. 10 shows a conventional coffee making machine with a housing 100 having a cold water reservoir 101, a coffee-containing basket compartment 102, a coffee pot 103 and a heated hot plate 104.

Figure 11:
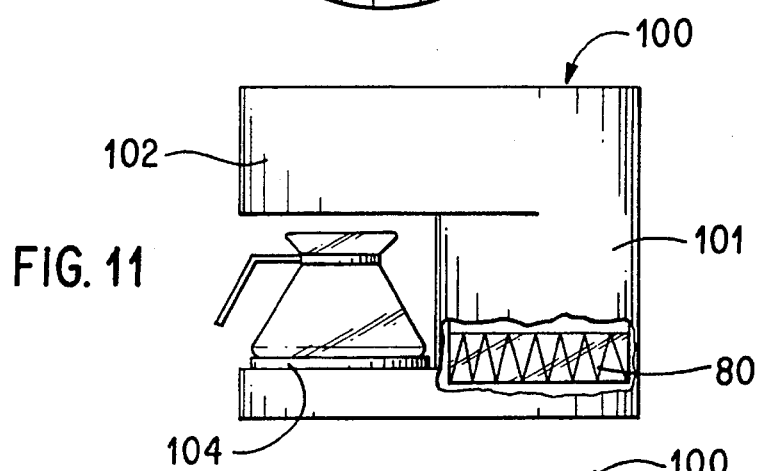
FIGS. 11, 12 and 13 show embodiments of disposition of the present filter material in a conventional coffee making machine.

FIG. 11 shows that same coffee making machine 100 having the pleated filter 80 of FIG. 8 disposed in the bottom of the cold water reservoir 101. That pleated configuration can be so disposed by way of a water-tight drawer (not shown) removable from the reservoir or can be simply placed at the bottom of the reservoir by manual insertion.

Figure 12:
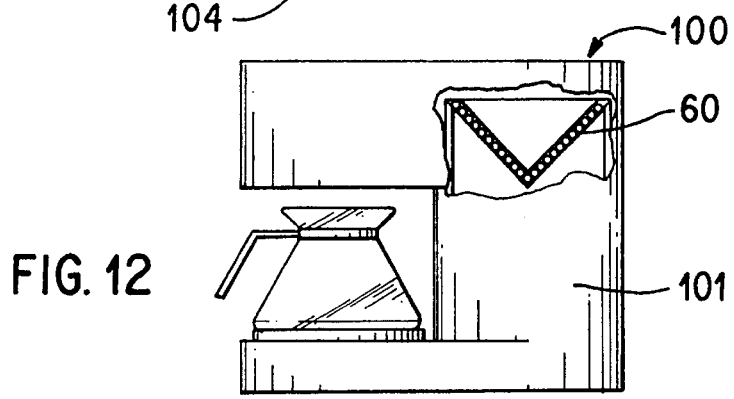

FIG. 12 shows the same coffee making machine 100 with the cone filter 60 of FIG. 6 fitted into the upper portion of the cold water reservoir 101. Preferably, in this case, the cone will have a peripheral bead (not shown) of an elastomer, such as rubber, to make the filter material 60 more secure therein.

Figure 13:
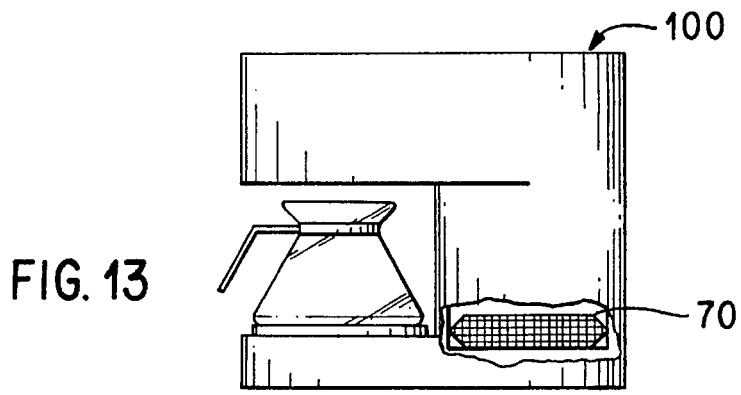

FIG. 13 shows that same coffee machine 100 having a disk 70, as shown in FIG. 7, placed at the bottom of the cold water reservoir, and again, either by a water-tight drawer (not shown) or by manual insertion.

The filter material is made by the following method. The fibers, as described above, are mixed with water to form a dispersion of the fibers in the water. The latex binder, in the form of an emulsion (5% to 70% solids), is then added with mixing to the dispersion to form a dispersed mixture of fibers and emulsion. After sufficient mixing, an emulsion-breaking agent is added, with mixing, to the mixture to form a precipitated binder on the fiber combination, where the precipitated binder is deposited onto the fiber within the mat, as shown in FIG. 2. Thereafter, to that combination is added the powder, with mixing, to dispose the powder onto the binder, again as shown in FIG. 2, and form a matting material. That matting material is then formed into a mat by conventional paper-making processes, as briefly described above.

By first depositing the binder on the fibers, by such precipitation, and only thereafter depositing the powder on the binder, the powder is stuck to the binder, during mixing, as briefly described above, in such a manner that it is firmly attached to the binder within the mat, but, at the same time, a substantial amount of the outer surface area of a particle of the binder upstands from and is not contacted with the binder, again as shown in FIG. 2. When the binder is a very sticky material, such as the preferred acrylic binder, substantial amounts of the powder can be disposed on the fibers (on the binder) to maximize chlorine removal from the water being filtered.

The emulsion-breaking agent is not critical and will depend, in part, on the particular emulsion in which the binder is dispersed. The combination of the latex and fibers, naturally, exhibit overall negative charges. Therefore, unless this natural condition is altered, the latex particles of the emulsion will not precipitate. This natural charge, and hence stability of the latex emulsion, can be broken by adjusting the pH of the latex emulsion and/or neutralizing the natural negative charge. Alum, for example, can both lower the pH and neutralize the natural negative charge and, hence, is a preferred emulsion-breaking agent. Alum, as well as other compounds, provides accessible positive charges for breaking the latex emulsion. Alternatively, modified starches are cationic and, thus, will provide positive charges for emulsion breaking. Starches will also enhance the dry strength of the formed mat and, thus, are a preferred agent.

It is also useful to provide a viscosity control agent in the mix the enhance the mat forming process. Gums, such as Karaya gum, are useful in this regard.

Conventional retention aids, such as Cartaretin AEM (an acrylamide), can be used to assure that all of the fibers and powder remain in the mat during the forming step.

Since emulsions are normally pH sensitive, as noted above, the binder emulsion can be broken by the adding thereto of a base to lower the pH. Any of the usual bases are useful, and the particular base is not critical.

The amount of the emulsion-breaking agent will, of course, depend upon the particular emulsion and the particular binder therein, but, generally speaking, the amount need be only that amount which will lower the pH or neutralize the negative charge to that emulsion-breaking point. For most emulsions, however, a pH of below about 4 will be sufficient for breaking that emulsion.

As noted above, the viscosity control agents are useful in the mixing processes and in depositing the mixture onto a formacious surface, such as a screen, for producing the laid mat. The viscosity control agent may be added in amounts up to about 2% or 3% and any of the conventional viscosity control agents may be used, e.g. gums, and the preferred gum is Karaya gum.

With the preferred embodiments, i.e. the acrylic binder, activated carbon, and the mode of placing that activated carbon on the binder, as explained above, gravity flow rates of at least 0.5 liter per minute per 100 square centimeters of the mat can easily be obtained, and flow rates even up to 5 liters per minute per 100 square centimeters of mat are obtainable. This is a very significant and high gravity flow rate, which makes the present filter material an ideal material for producing filter media for coffee pots and the like, as described above. Gravity flow is defined as the flow rate of water through the filter with no more than one foot of static head pressure on the water.

The invention will now be illustrated by the following examples, but it is to be understood that the examples are not limiting thereof but merely illustrate the same. In the examples, as in the specification and claims, all percentages and parts are by weight, unless otherwise specified.

EXAMPLE 1

This example illustrates a method of producing the filter material. The apparatus used in this example is a conventional paper-making machine, the details of which need not be described herein, for sake of conciseness, since those details are well known to those skilled in the art.

Preparation of Starch and Alum

Using a 1000 ml beaker on top of a Corning hot plate and a G. K. Heller heavy duty laboratory stirrer with a series "H" motor controller @ a speed of 500 rpm, add 32 g Cato 2A starch to 500 mls of cold water, heat to 200° F. for 30 min., turn heat off, add 32 g alum and 300 mls of cold water. Total amount of solution 800 mls.

Preparation of Gum

Using a 1000 ml beaker on top of a Corning hot plate and a G. K. Heller heavy duty laboratory stirrer with a series "H" motor controller @ a speed of 500 rpm, heat water (615 mls) to 180° F., then add 3.67 g triethanolamine and 1.76 g ammonia (gum dispersing agents), then slowly add 8 g Karaya gum; add 185 g cold water, agitate for 5 min. @ a speed of 250 rpm. Total amount of solution 800 mls.

Preparation of Flocculant

Using a 500 ml beaker and a G. K. Heller heavy duty laboratory stirrer with a series "H" motor controller @ a speed of 250 rpm, add 6.3 g Cartaretin AEM liquid to 393.7 ml of water. Total amount of solution 400 mls.

Preparation of the Matting Material

Using a small Osterizer 12-speed blender with 700 mls of water, pulp 9 g (dried) bleached Kraft softwood pulp (cellulose fibers—"HP11"—Trademark of Buckeye Cellulose) on "high" (liquify selection button) for 30 seconds, stop blender; add 2.8 g acrylic fiber and pulp an additional 30 seconds. Transfer slurry to 1800 ml beaker. Using a G. K. Heller heavy duty laboratory stirrer with a series "H" motor controller @ a speed of 200 rpm, add 5.7 g of B. F. Goodrich 26083 latex with 5.7 g water; add 15 g of Starch and Alum solution, wait 2 min., add 27.4 g gum solution; in the above blender using 400 ml of water, add 11.8 g activated carbon; run on low speed for 5 seconds and transfer to slurry rinse with 50 ml of water, agitate for 2 min., then add 4.2 g. of Flocculant solution and transfer to handsheet mold which has a water level of 12.5 liters; while stirring slurry pull vacuum switch to form sheet, with 24 inch vacuum. Open cover of handsheet mold, take out formed sheet and use a vacuum machine (Dayton wet & dry) for additional removal of moisture; transfer sheet to an Emerson speed dryer—temp setting 270° F.—wait until dry (10 min.).

EXAMPLE 2

Using a small Osterizer 12 speed blender with 700 mls of water, pulp 11.8 g staple polyester fiber on "high" (liquify selection button) for 60 seconds. Transfer slurry to 1800 ml beaker. Using a G. K. Heller heavy duty laboratory stirrer with a series "H" motor controller @ a speed of 200 rpm, add 5.7 g of B. F. Goodrich 26083 latex with 5.7 g water; add 15 g of Starch and Alum solution, wait 2 min., add 27.4 g gum solution; in the above blender using 400 ml of water, add 11.8 g activated carbon run on low speed for 5 seconds and transfer to slurry rinse with 50 ml of water, agitate for 2 min., then add 4.2 g of Flocculant solution and transfer to handsheet mold which has a water level of 12.5 liters; while stirring slurry pull vacuum switch to form sheet, with 24 inch vacuum. Open cover of handsheet mold and take out formed sheet and use a vacuum machine (Dayton) for additional removal of moisture; transfer sheet to an Emerson speed dryer—temp. setting 270° F.—wait until dry (10 min.).

EXAMPLE 3

This example demonstrates the dechlorination abilities of the filter material produced by Example 1. In this test 20 cc. per minute of distilled water containing 10 to 11 ppm chlorine were continuously injected through a sample holder containing 10 layers of 1 inch diameter filter material produced according to Example 1. The 10 layers of mat were placed in a sample cell and the cell closed and tightened. At a flow rate of 20 cc. per minute, the residual chlorine was tested at 10 minute intervals using a HACH testing method DR2000 Program #80 for a period of 1 hour. The residual chlorine in parts per million was as follows:

| Time-Minutes | Chlorine Residual |
| --- | --- |
| 10 | .01 |
| 20 | .01 |
| 30 | .01 |
| 40 | .01 |
| 50 | .03 |
| 60 | .04 |

As can be seen from the above results, the present filter material has considerable capabilities for removing chlorine and reduces the chlorine content from 10 to 11 ppm to 0.01 ppm for up to 40 minutes and with no more than 0.04 ppm for up to 60 minutes, which would translate into the equivalent of about 80 pots of brewed coffee with more than 80% chlorine removal efficiency.

EXAMPLE 4

This example shows the flow rate produced by the filter media of Example 1. One layer of the filter media was placed in a 4⅜ inch diameter by 2½ inch high disk sample holder.

500 ml of distilled water was passed through the above sample holder by pouring to measure the flow rate. The flow rate obtained was 500 ml in 65 seconds.

As a comparison a filter material identical to that of Example 1, with the exception that the filter material had a conventional non-hydrophilic acrylate binder and not the present hydrophilic binder, was likewise tested. Without the present hydrophilic binder, the fibers remained hydrophobic. The flow rate in that sample was 3 ml in 150 minutes.

As can be seen, this second flow rate test shows that conventional fibers or filter materials with conventional hydrophobic properties have a very low flow rate and are not acceptable for uses such as in coffee making machines, but with the present invention, flow rates quite acceptable for such conventional coffee making machines are obtainable.

What is claimed is:

1. A filter material for removing chlorine from cold water used in preparing a human-consumable beverage, comprising:
   (a) at least one layer of a mat of laid fibers selected from the group consisting of cellulosic fibers and synthetic textile fibers and mixtures thereof;
   (b) a synthetic hydrophilic, food-grade latex binder deposited onto the fibers within the mat in an amount sufficient to so bind the fibers together within the mat that during a filtration of cold water through the mat no substantial amount of fibers are displaced therefrom and in an amount insufficient to substantially reduce a gravity flow rate of cold water through the mat to less than about 0.3 liter per minute per 100 square centimeters of said mat; and
   (c) a water-insoluble chlorine adsorbent or absorbent solid powder disposed on said binder such that no more than 65% of the total surface area of the powder is substantially contacted by said binder.

2. The filter material of claim 1 wherein there are from 2 to 20 layers of said mat.

3. The filter material of claim 2 wherein there are from 3 to 7 layers of said mat.

4. The filter material of claim 1 wherein the fibers are all cellulosic fibers.

5. The filter material of claim 1 wherein the fibers are all synthetic textile fibers.

6. The filter material of claim 1 wherein the fibers are a mixture of cellulosic fibers and synthetic textile fibers.

7. The filter material of claim 6 wherein the weight percent of synthetic fibers is from about 1% to 20%.

8. The filter material of claim 7 wherein the weight percent of synthetic fibers is from about 5% to 15%.

9. The filter material of claim 8 wherein the synthetic fiber is an acrylic fiber.

10. The filter material of claim 9 wherein a solid food-grade surfactant is disposed within the mat.

11. The filter material of claim 10 wherein the amount of the solid food-grade surfactant is from 0.1% to 2% based on the weight of the mat.

12. The filter material of claim 1 wherein the synthetic fibers are selected from the group consisting of acrylic fibers, polyester fibers, nylon, olefin fibers and vinyl fibers.

13. The filter material of claim 1 wherein the cellulosic fibers are selected from the group consisting of cellulose fibers, methylcellulose fibers, rayon and cotton fibers.

14. The filter material of claim 1 wherein the latex binder is selected from the group consisting of an acrylic latex, a vinyl latex, a nitrile latex and an acrylate latex.

15. The filter material of claim 1 wherein the binder is an acrylic latex.

16. The filter material of claim 1 wherein the amount of binder in the mat is from about 5% to 40%, based on the weight of the mat.

17. The filter material of claim 16 wherein the amount of binder in the mat is from about 10% to 30%, based on the weight of the mat.

18. The filter material of claim 1 wherein said gravity flow rate is at least 0.5 liter per minute per 100 square centimeters of said mat and up to 5 liters per minute per 100 square centimeters of mat.

19. The filter material of claim 1 wherein the powder is activated carbon.

20. The filter material of claim 19 wherein the powder is silver- or nickel-impregnated activated carbon.

21. The filter material of claim 1 wherein the amount of powder in the mat is from 20% to 70%, based on the weight of the mat.

22. The filter material of claim 21 wherein said percentage is between about 40% and 60%.

23. The filter material of claim 1 wherein no more than about 50% of the total surface area of the powder is substantially contacted by said binder.

24. The filter material of claim 23 wherein said percentage is no more than 40%.

25. The filter material of claim 1 wherein the average particle size of the powder is less than 1,000 microns.

26. The filter material of claim 25 wherein the average particle size is less than 100 microns.

27. The filter material of claim 1 wherein the mat is substantially bacterially static for up to 50 filtrations.

28. The filter material of claim 1 wherein the mat is substantially bacterially static for up to 20 filtrations.

29. The filter material of claim 1 wherein the mat is substantially bacterially static for up to 10 filtrations.

30. The filter material of claim 1 wherein the binder substantially covers the surfaces of the fibers in the mat.

31. The filter material of claim 30 wherein the binder is substantially continuous over the fibers of the mat.

32. A method for making the filter material of claim 1, comprising:
   (a) mixing the fibers in water to form a dispersion of the fibers in the water;
   (b) adding and mixing the latex binder in the form of an emulsion to the dispersion to form a dispersed mixture of the fibers and emulsion;
   (c) adding and mixing an emulsion-breaking agent to the mixture to form a precipitated binder on the fibers combination where the precipitated binder is deposited onto the fibers within the mat;
   (d) adding to the combination and mixing the powder with the combination to dispose the powder onto the binder and form a matting material; and
   (e) forming a mat of the matting material.

33. The method of claim 32 wherein the agent is alum.

34. The method of claim 33 wherein the alum is added with a starch.

35. The method of claim 32 wherein a viscosity control agent is added to the combination before the powder is added thereto.

36. The method of claim 35 wherein the viscosity control agent is a gum.

37. The method of claim 36 wherein the gum is Karaya gum.

* * * * *